(12) United States Patent
Angerer et al.

(10) Patent No.: US 7,627,431 B2
(45) Date of Patent: Dec. 1, 2009

(54) METHOD FOR PROCESSING SEISMIC DATA CORRESPONDING TO ACQUISITIONS FROM A MEDIUM WITH AZIMUTHAL ANISOTROPY

(75) Inventors: Erika Angerer, Brentford (GB); Didier Lecerf, Brentford (GB); Pierre Lanfranchi, Brentford (GB)

(73) Assignee: Compagnie Generale de Geophysique, Massy (FR)

( * ) Notice: Subject to any disclaimer, the term of this patent is extended or adjusted under 35 U.S.C. 154(b) by 0 days.

(21) Appl. No.: 10/554,477

(22) PCT Filed: Apr. 23, 2004

(86) PCT No.: PCT/FR2004/000996

§ 371 (c)(1),
(2), (4) Date: May 15, 2006

(87) PCT Pub. No.: WO2005/040859

PCT Pub. Date: May 6, 2005

(65) Prior Publication Data
US 2006/0247860 A1 Nov. 2, 2006

(30) Foreign Application Priority Data
Apr. 23, 2003 (FR) .................... 03 04961

(51) Int. Cl.
*G01V 1/00* (2006.01)
*G01V 9/00* (2006.01)

(52) U.S. Cl. ................. 702/14; 702/9; 702/17; 702/18; 367/75

(58) Field of Classification Search ............... 702/14, 702/15–18, 2, 5, 9, 10; 367/73, 75
See application file for complete search history.

(56) References Cited

U.S. PATENT DOCUMENTS 5,610,875 A * 3/1997 Gaiser .................. 367/75

* cited by examiner

*Primary Examiner*—Edward Raymond
*Assistant Examiner*—Phuong Huynh
(74) *Attorney, Agent, or Firm*—David M. Ostfeld (57) ABSTRACT

Method of processing seismic data corresponding to acquisitions carried out in a medium exhibiting azimuthal anisotropy, characterized in that for two sets of data corresponding, for one and the same seismic variable and for one and the same ground zone, to at least two different source/azimuth receiver pair sectors, an average between the data which correspond to the azimuth considered and data which correspond, for the same variable and the same ground zone, to a perpendicular azimuth sector is determined for each of the azimuths considered, and in that an estimate of the part common to the two sets thus obtained of averaged data is determined.

17 Claims, 4 Drawing Sheets

METHOD FOR PROCESSING SEISMIC DATA CORRESPONDING TO ACQUISITIONS FROM A MEDIUM WITH AZIMUTHAL ANISOTROPY

GENERAL FIELD

The present invention pertains to the processing of seismic data corresponding to acquisitions carried out in a medium exhibiting azimuthal anisotropy.

It advantageously finds particular application as filtering processing prior to the implementation of processing for characterizing anisotropy and in particular for characterizing anisotropy due to the fracturing of the rock.

Azimuthal anisotropy or "Horizontal Transverse Anisotropy" ("HTI" anisotropy) occurs in geological units containing families of vertical and parallel fractures with a maximum dimension of a decametre.

Rüger (1998) has provided a mathematical approximation for the coefficient of reflection R of the seismic wave (P wave) in such a medium depending on the orientation of the source/receiver pair with respect to the principal axis of anisotropy (corresponding to the orientation of the fractures):

$$R(\phi-\theta) = R_0 + [G_1 + G_A \cos^2(\phi-\beta)] \sin^2\theta$$

with $R_0$=Intercept
   Gl=Isotropic Gradient
   GA=Anisotropic Gradient
   $\phi$=Azimuth of the source receiver pair with respect to North
   $\beta$=Azimuth of the principal axis of anisotropy with respect to North
   $\theta$=angle of incidence

PRESENTATION OF THE INVENTION

An aim of the invention is to propose a processing making it possible to isolate, within a set of seismic data, data specific to anisotropy corresponding to 45° from the principal axis.

Another aim of the invention is to filter seismic amplitude data so as to allow the determination of azimuthal anisotropy parameters.

In its application FR 02 00397 the applicant has already proposed a data filtering method in which, to filter two data sets representative of at least one same physical parameter over one and the same zone, an estimate of a component common to these two data sets is determined.

For its part the invention proposes a method of processing seismic data corresponding to acquisitions carried out in a medium exhibiting azimuthal anisotropy, characterized in that for two sets of data corresponding, for one and the same seismic variable and for one and the same ground zone, to at least two different source/azimuth receiver pair sectors, an average between the data which correspond to the azimuth considered and data which correspond, for the same variable and the same ground zone, to a perpendicular azimuth sector is determined for each of the azimuths considered, and in that an estimate of the part common to the two sets thus obtained of averaged data is determined.

As will be understood in the subsequent description, in the case where this seismic variable is the reflectivity, the two data sets obtained by averaging data corresponding to perpendicular azimuth sectors both correspond, for the same variable and the same zone, to an azimuth at 45° to the principal axis.

A determination of an estimate of the common part—that is to say of the part which is invariant between the two data sets—yields, for the azimuth at 45° to the principal axis, filtered data in which the uncorrelated noise has been removed.

Also, it will be noted that this property is true not only when the seismic variable considered is reflectivity, but more generally for any seismic variable that depends on reflectivity or whose azimuthal variation can be approximated by a linear combination of cosine squared and/or of sine squared: seismic amplitudes, attributes calculated from seismic amplitudes, NMO velocities, etc.

According to another aspect of the invention likewise, for at least one azimuth:
   the data set which corresponds to an estimate of the part common to the two sets of averaged data is subtracted from a data set corresponding to a sector along this azimuth and from a data set corresponding to a sector along a perpendicular azimuth,
   the sign of one of the two sets of residual data that is thus obtained is inverted,
   an estimate of the part common to this set of residual data whose sign has been inverted and to the other set of residual data is determined.

It is in fact possible to show that the common data thus obtained correspond to the variations relating to the anisotropy along the azimuths considered.

Knowing this residual anisotropy, sets of filtered residual data are reconstituted.

The anisotropy variations and/or the filtered residual data thus obtained can be used directly for the calculation of the azimuthal anisotropy parameters.

PRESENTATION OF THE FIGURES

Other characteristics and advantages of the invention will emerge further from the description which follows, which is purely administrative and nonlimiting, and should be read in conjunction with the appended drawings, in which.

DESCRIPTION OF ONE OR MORE MODES OF IMPLEMENTATION

Example of Filtering Processing

Here we are interested in the case where we have seismic data corresponding for one and the same ground zone to at least two different source/receiver pair azimuths and to at least two azimuths perpendicular to them.

These data are for example cubes of seismic amplitudes.

The data may also be cubes of attributes, derived from these cubes of seismic amplitudes: RMS amplitudes, average amplitudes, NMO correction velocities, AVO attributes, impedances, etc.

The term "cube" is understood here and throughout the present text to mean any gather of seismic data (amplitudes, attributes) associating given positions over the ground zone over which the acquisition which corresponds to these seismic data has been carried out, a succession of values taken successively over time by the amplitude or the attribute considered.

The seismic amplitude cubes used to obtain the data cubes correspond for example to gathers of "common midpoint" or "CMP" traces forming the subject of an NMO correction and as appropriate of static correction processing.

More precisely, the data sets used for each azimuth are a plurality of cubes of a sector representative of the azimuth considered. The number of sectors taken into account and their aperture are chosen in such a way as to optimize the regular distribution of the data azimuth-wise.

Figure 1:
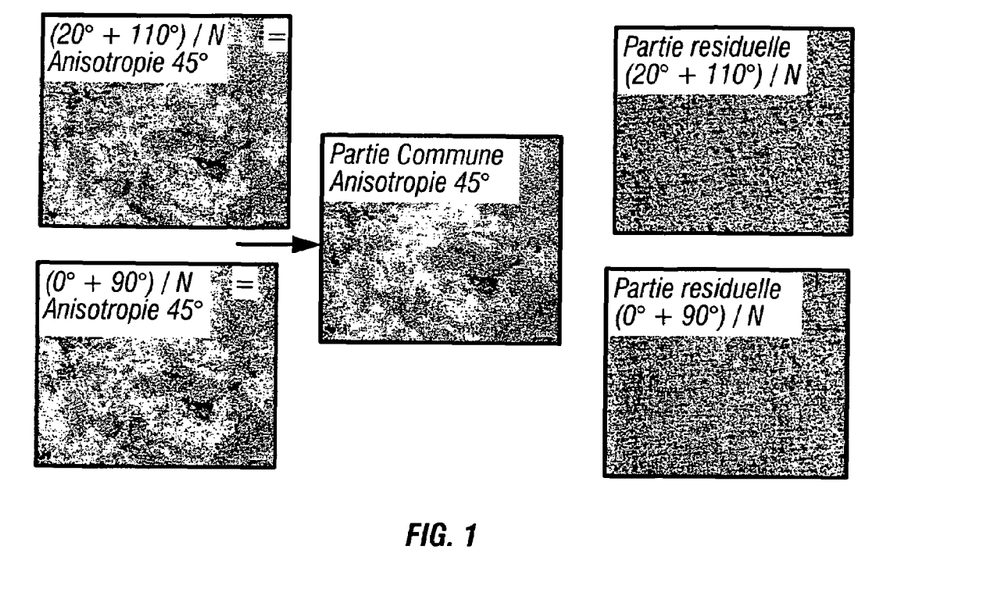
FIGS. 1 and 2 illustrate various steps of a process in accordance with a possible mode of implementation of the invention.
Figure 2:
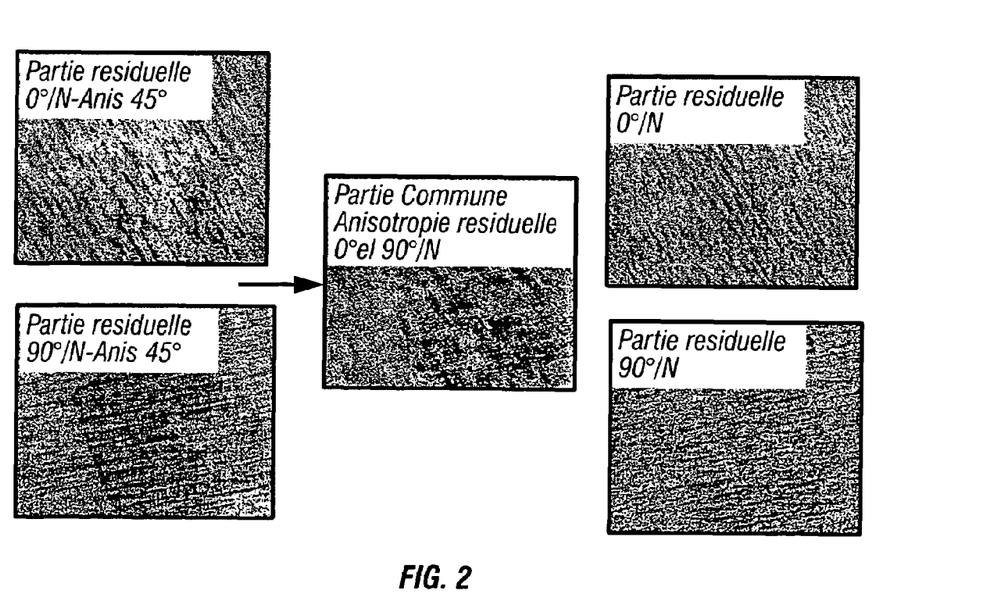

In the example illustrated in FIGS. 1 and 2, amplitude maps are available which correspond, for a given time, to amplitudes of gathers of seismic traces arising from acquisitions according to at least two different source/receiver pair azimuths (0° and 20°) and at least two azimuths perpendicular to the latter (90° and 110°).

Several maps corresponding to various source/receiver pairs in the sector considered as representative of this azimuth are available for each of these azimuths.

In the example illustrated in these figures, the processing comprises the following various steps.

In a first step, the amplitude map corresponding to the average of the amplitude maps of the sector representative of this azimuth and of those of the sector representative of the perpendicular azimuth (resp. 90° and 110°) is determined for each of the two source/receiver pair azimuths considered (respectively 0° and 20°).

The maps on the left part of FIG. 1 correspond in the example chosen the one to the average of the maps corresponding to the 0° and 90° azimuths, the other to the average of the maps corresponding to the 20° and 110° azimuths.

It is possible to show that the average of maps corresponding to perpendicular source/receiver pair azimuths is equivalent to a map corresponding to that of a recording made with a source/receiver azimuth at 45° to the principal axis of anisotropy.

Specifically, according to the mathematical approximation formula cited previously:

$$\frac{R(\phi-\beta)+R\left(\frac{\phi+\pi}{2}-\beta\right)}{2} = R_0 + \left(G_1 + G_A \frac{\cos^2(\phi-\beta)+\cos^2\left(\frac{\phi+\pi}{2}-\beta\right)}{2}\right)\sin^2\theta$$

$$= R_o + \left(G_1 + G_A \frac{\cos^2(\phi-\beta)+\sin^2(\phi-\beta)}{2}\right)\sin^2\theta$$

$$= R_0 + \left(G_1 + G_A \frac{1}{2}\right)\sin^2\theta$$

$$= R(\pi/4)$$

$$= R(45°)$$

The two averages thus obtained on completion of the first step illustrated in the left part of FIG. 1 therefore both correspond to one and the same recording with a source/receiver azimuth at 45° to the principal axis of anisotropy.

By calculating the common part of these two averages of pairs of perpendicular azimuths that are in theory identical, the uncorrelated noise is eliminated from each average.

This calculation of a common part is carried out in a second step of the processing, for example by automatic factorial co-kriging. In FIG. 1, the result corresponds to the mapping represented in the central part.

The common part thus obtained then corresponds to the noiseless reference of the value of the seismic amplitude at 45° to the azimuthal principal axis of anisotropy.

In a third step, this common part can be subtracted from the two average mappings calculated in the first step.

The two residual mappings thus obtained (right part of FIG. 1) make it possible to reveal the noise eliminated.

The common mapping determined in the second step can moreover be used, as illustrated in FIG. 2, to deduce therefrom the spatially organized noise and the random noise in the initial mappings corresponding to each azimuth sector.

For this purpose it is possible, in a fourth step of the processing, to determine residual mappings which, for a given azimuth and its perpendicular azimuth, correspond to the difference between on the one hand the amplitude for the azimuth considered and on the other hand the amplitude of the common part which is used as reference and which corresponds theoretically to a recording at 45° to the principal axis of anisotropy.

These residual maps are illustrated in the left part of FIG. 2 in the case of the azimuth corresponding to an angle of 0° and of the 90° perpendicular azimuth.

Once these two residual maps have been determined, the amplitudes of one of them are inverted (multiplication by $-1$) and, in a fifth step, the part common to the two residual maps thus obtained is determined.

This determination of the common part is likewise carried out by way of example by automatic factorial co-kriging.

The common map thus obtained (represented at the centre in FIG. 2) corresponds to the residual amplitude value corresponding to the azimuthal anisotropy for these two perpendicular azimuths. By calculating the common part it is possible to filter the random noise and the spatially correlated noise of the residual amplitude maps.

It is in fact possible to show that the residuals corresponding to the difference of the amplitudes of two perpendicular azimuths and of the amplitudes corresponding to an azimuth at 45° to the principal axis of anisotropy are equivalent, apart from the sign:

$$R(\phi-\beta)-R(\pi/4)=-[R(\phi+\pi/2-\beta)-R(\pi/4)]$$

Each sector can then be recomposed through the sum of the residual amplitudes (while complying with their polarities (sign)) and of the filtered common component which is obtained on completion of the second step and which corresponds to a source/receiver azimuth at 45° to the principal axis of anisotropy. Each sector is then filtered to remove random noise and spatially correlated noise (acquisition noise).

It is then possible to implement, on the filtered data thus obtained, processing methods for determining global values of azimuthal anisotropy and in particular inversion processing making it possible to determine the parameters of fractures, which parameters depend on the azimuthal variation as cosine squared or sine squared.

For this purpose, a processing consisting in tailoring the parameters of an ellipse to the azimuthal variations of the coefficient R is implemented. This is performed for example by inversion using the least squares as error criterion.

A processing in this sense is for example of the type of those described in the following publications:

Hall et al., "Fractured reservoir characterization using P-wave AVOA analysis of 3D OBC data, TLE 2002, Vol. 21, No. 8, 777-781;

Jennifer, "Azimuthal AVO: Methodology and data examples"
TLE, 2002, Vol. 21, No. 8, 782-786;

For a general presentation of the basic theoretical knowledge on this subject, reference may advantageously be made to the following publication:

Rüger, A., 1998 "Variation of P-Wave reflectivity with offset and azimuth in anisotropic media"—Geophysics, Vol. 63, No. 8, 935-947.

It will be noted that in the example just described, the data are seismic amplitudes.

The processing described is applied however in the same way to data corresponding to attributes derived from these amplitudes: AVO gradient, average amplitudes, elliptic variation of NMO velocities in an anisotropic medium, determined according to the method of Tvsankin (1997) or Grechka and Tvanskin (1998, 1999), variation of elastic impedance with azimuth, determined according to the method of Connoly (1998).

It is applied in a more general manner in respect of any seismic variable that depends on reflectivity or whose azimuthal variation may be approximated with respect to the azimuth as a linear combination of cosine squared and/or of sine squared.

Moreover, in the example just described, the data processed are 2D maps

It is of course also possible to implement the processing proposed on data cubes.

Example of Calculating the Common Part on Data Cubes

Figure 3:
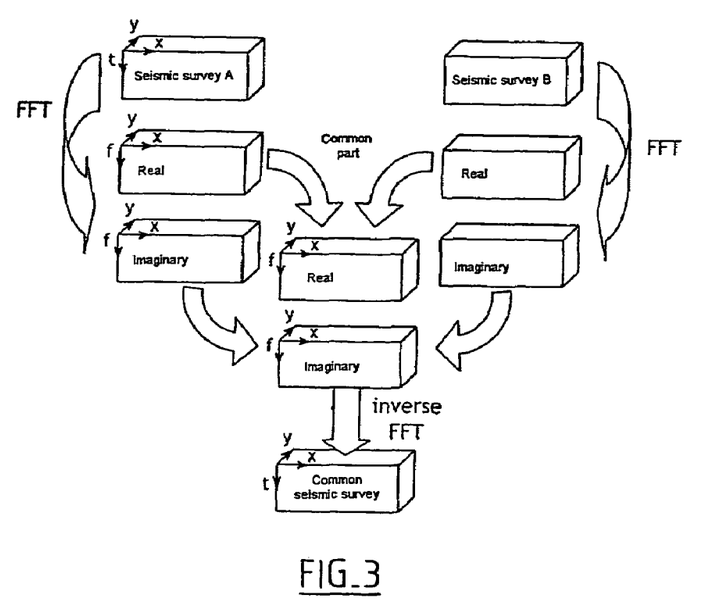
FIG. 3 illustrates a possible mode of implementation for the determination of an estimate of the part common to two cubes each corresponding to the summation of two perpendicular azimuths.

FIG. 3 illustrates an exemplary calculation on data cubes.

The initial time data are transformed by FFT into cubes of real parts and of imaginary parts in the frequency domain.

The common part of each real and imaginary frequency plane is calculated by the method of so-called "automatic factorial co-kriging" with a 2D operator in the (x, y) plane.

By the process of inverse Fourier transform of the common cube of the real parts and of the common cube of the imaginary parts, the time common cube of the seismic data is thus obtained.

A more detailed example of processing is given below:

1) In a first step, the data which correspond to the two cubes to be processed (cube A, cube B) are read. These data are recorded in a file where each trace is identified by a row number and a column number which correspond to a position on the ground.

2) In a second step, a time window is selected to define on the seismic traces the time interval taken into consideration for the processing. The portions of traces thus selected are supplemented as appropriate with zero values to obtain for each trace a number of samples corresponding to a power of two as needed for the fast Fourier transform of the following step.

3) In a third step, a fast Fourier transform (FFT) is applied to the succession of samples corresponding to each of the traces and to the time window selected.

A total of four frequency-wise cubes are thus obtained corresponding to the real part and the imaginary part of each selection of the cubes A and B.

4) For each frequency plane, two (2D) maps, the one corresponding to the data of cube A and the other to the data of cube B, are then constructed, in the real domain on the one hand and in the imaginary domain on the other hand.

An automatic factorial co-kriging processing is then applied to the maps thus obtained for the data cubes A and B so as to deduce therefrom a map common to the two initial maps.

This factorial co-kriging processing is of course carried out independently on the one hand with the real parts and on the other hand with the imaginary parts.

The processing comprises in particular, in each of these two domains, the following steps:

as a function of a given variogram radius, calculation of a 2D variogram for the map corresponding to the data A and, for the map corresponding to the data B, calculation of a cross-variogram.

construction of the co-variance and cross-variance matrices from the 3 variograms thus obtained.

solving of the factorial co-kriging system which corresponds to the matrices, so as to deduce therefrom a spatial operator, that is to say one which is dependent on the row-wise and column-wise position of the sample considered on the map. To stabilize the inversion of the matrix of the system, a constant which corresponds to a very small percentage of the square root of the product of the two variances is added to the diagonal of the co-variance matrices.

the spatial operator thus obtained is then convolved with the initial maps to obtain the common part of the two maps. In fact, a single convolution is sufficient.

5) The processing just described is repeated for each frequency plane of the real and imaginary parts. Two cubes are obtained, one for the common real parts and the other for the common imaginary parts.

6) Once all the frequency planes have been calculated, an inverse Fourier transform of the common complex cubes is implemented so as to obtain a cube in terms of common seismic time.

Other variants of the calculation are of course conceivable.

Figure 4:
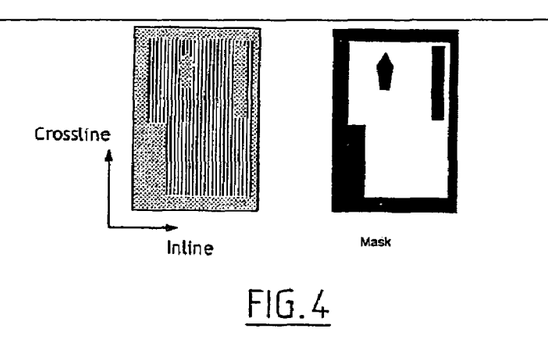
FIG. 4 illustrates an exemplary mask applied to 2D maps.

Thus, as illustrated in FIG. 4, the calculation of the operator may be limited to specific regions corresponding to valid data. The variograms and cross-variograms are thus calculated over the regions defined by the mask. The mask can for example hide a dataless zone due to a drilling platform or very noisy data on account of edge effects. The use of a mask will improve the quality of the operator and therefore of the noise filtering. The mask is defined with white valid values (1) and with black nonvalid values (0).

Figure 5:
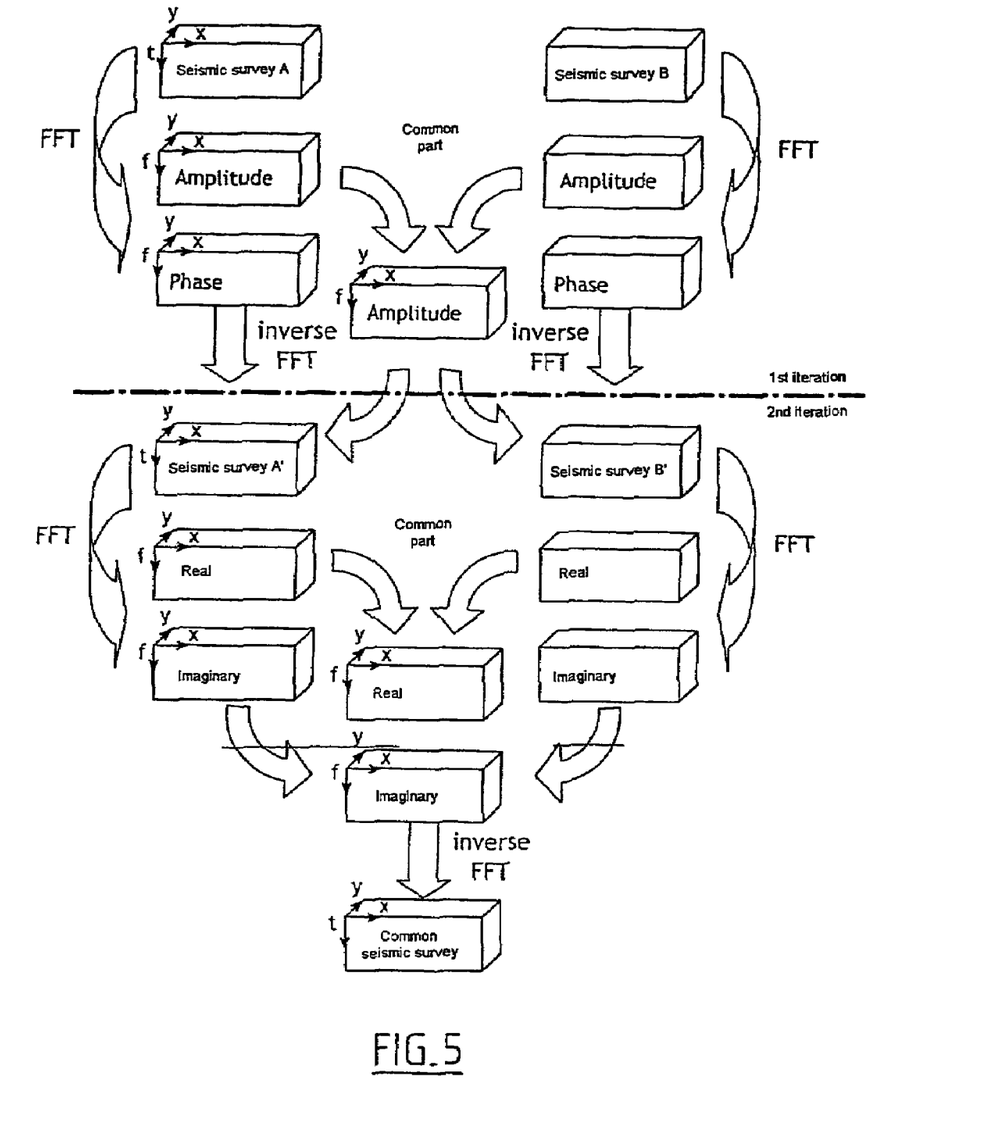
FIG. 5 illustrates another possible mode of implementation with several iterations.

It is sometimes advantageous to do the calculation of the common cube in two iterations: (FIG. 5).

The first iteration consists in calculating a common amplitude spectrum.

For this purpose, for each frequency plane, an amplitude map and a phase map are determined from the maps of real and imaginary parts. Next, from the amplitude maps thus determined for the data A and the data B for each frequency, a common spectral amplitude map is determined. This map is in an appropriate manner determined by automatic factorial co-kriging.

The real and imaginary part of A and B is then reformulated with the common amplitude thus obtained and the initial phase of A and B. After inverse FFT processing of the cubes, two seismic cubes A' and B' having the same frequency content are obtained.

These two cubes are then processed with a second iteration.

The second iteration calculates the real and imaginary common part of A' and B'. In fact, it will fix the common phase of the two seismic cubes A' and B' since the amplitude spectrum is already common after the first iteration.

The common part is then determined in the same manner as previously described with reference to FIG. 4.

Figure 6:
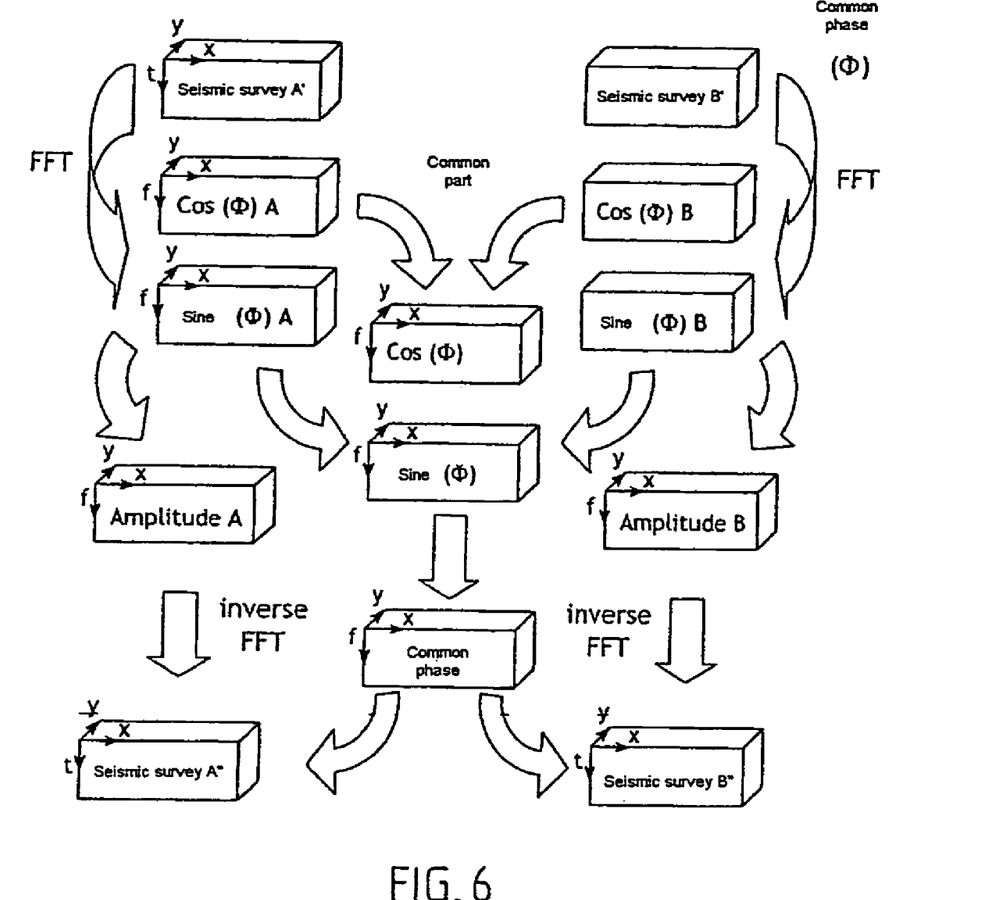
FIG. 6 illustrates another also possible variant of implementation.

Yet another possible variant implementation is illustrated in FIG. 6.

In this variant implementation, amplitude cubes associated respectively with cube A and with cube B are extracted.

In parallel or in a second step, the real and imaginary parts of the cubes A and B yield cubes corresponding to the cosine and to the sine of the phase of the data.

Cubes corresponding the one to the common part of the cosine cubes, the other to the common part of the sine cubes are then determined.

Next, a cube is determined whose data are the ratio of the data of the sine cube and of the cosine cube thus obtained: this produces a cube giving the common part of the phase.

This common phase cube is combined with the two amplitude cubes initially extracted from cubes A and B so as to deduce therefrom filtered cubes A' and B'.

These two filtered data cubes may themselves form the subject of the second iteration described with reference to FIG. 5.

As a further variant, it is possible to calculate the cube common to the data cubes A and B by combining on the one hand the cube of common-phase part and on the other hand the cube of common amplitude part.

It will be noted that in the examples above, the common part of each frequency plane has been calculated by a geostatistic method called automatic factorial co-kriging (or automatic multi-variable kriging analysis).

Other processing procedures for estimating the common part, and in particular processing procedures implementing factorial co-kriging are conceivable.

It is in particular possible to determine a common part directly in the time domain over a succession of seismic amplitude (or other data) maps (x, y).

For each time considered, the part common to the two maps which correspond to this time is then determined by implementing factorial automatic co-kriging processing.

Likewise, the processing can use 3D operators instead of 2D operators. The factorial automatic co-kriging processing in fact generalizes with a three-dimensional co-variance matrix.

It should be noted that the use of 2D (x, y) operators (or 3D as the case may be) renders the method highly effective for filtering spatially organized noise.

Annex 1—Reminder on Factorial Co-kriging

Described below is an example of obtaining a common map by factorial co-kriging. The two functions corresponding to these two maps are denoted Z1 and Z2.

Firstly, the cross variogram of these two functions is calculated, the values of which are:

$$\gamma_{12}(h) = \frac{1}{N}\sum (Z1(x) - Z1(x+h))(Z2(x) - Z2(x+h))$$

where x and x+h denote the pairs of points taken into consideration along the direction and for the distance h for which the value of the variogram is determined, and where N is the number of these pairs of points for this direction and this distance.

Knowing this cross-variogram, an estimate of the function corresponding thereto is then determined, this function satisfying:

$$Z^*_{12}(x) = \Sigma \lambda_\alpha^1 Z_\alpha^1 + \Sigma \lambda_\beta^2 Z_\beta^2$$

where $\alpha$ and $\beta$ are two dummy indices denoting the points considered around the point x for which we seek to determine an estimate of the said function, $Z_\alpha^1$ and $Z_\beta^2$ being the value at the said point x, N being the number of these points and where $\lambda_\alpha^1$ and $\lambda_\beta^2$ are weighting coefficients.

These weighting coefficients $\lambda_\alpha^1$ and $\lambda_\beta^2$ are determined by inverting the co-kriging equation:

$$\begin{bmatrix} C_{11}11 & \cdots & C_{11}N1 & C_{12}11 & \cdots & C_{12}11 \\ \cdots & \cdots & \cdots & \cdots & \cdots & \cdots \\ C_{11}1N & \cdots & C_{11}NN & C_{12}11 & \cdots & C_{12}NN \\ C_{21}11 & \cdots & C_{21}N1 & C_{22}11 & \cdots & C_{22}N1 \\ \cdots & \cdots & \cdots & \cdots & \cdots & \cdots \\ C_{21}1N & \cdots & C_{21}NN & C_{22}11 & \cdots & C_{22}NN \end{bmatrix} \begin{bmatrix} \lambda_{11} \\ \cdots \\ \lambda_{1N} \\ \lambda_{21} \\ \cdots \\ \lambda_{2N} \end{bmatrix} = \begin{bmatrix} C_{12}1X \\ \cdots \\ C_{12}NX \\ C_{12}1X \\ \cdots \\ C_{12}NX \end{bmatrix}$$

where the coefficients $C12\alpha\beta$ and $C21\alpha\beta$ are the cross-variance values of the functions Z1 and Z2 at the points corresponding to the indices $\alpha$ and $\beta$ where the coefficients $C11\alpha\beta$ and $C22\alpha\beta$ are the covariance values respectively of the function Z1 and of the function Z2 at the said points. The index X corresponds to the point denoted by x previously.

It will be noted that the matrix which appears in this equation has the advantage of being invertible under certain calculation conditions.

In this way, by using the experimental covariances, the two variables corresponding to the two series of initial data are automatically decomposed into a common components and two orthogonal residual components. The regularity of the data implies that the experimental covariance is known for all the distances used. No interpolation is necessary and the matrix is positive definite.

The function thus obtained is an estimate of the component common to the two series of data that the two maps constitute.

Annex II—References

Coléou, T., 2002, Time-lapse filtering and improved repeatability with automatic factorial co-kriging (AFACK), 64th Mtg.: Eur. Assn. Geosci. Eng., Session: A018

Hall, S. A., Kendall, J-M., and Barkved, O. I. 2002 "Fractured reservoir characterization using P-wave AVOA analysis of 3D OBC data, TLE, Vol. 21, No. 8, 777-781

Jenner, E., 2002, "Azimuthal. AVO: Methodology and data examples"—TLE, Vol. 21, No. 8, 782-786

Rüger, A., 1998, "Variation of P-wave reflectivity with offset and azimuth in anisotropic media"—Geophysics, Vol. 63, No. 8, 935-947

Tsvankin, I., 1997, "Reflection moveout and parameter estimation for horizontal transverse isotropy", Geophysics, Vol. 62, No. 2, 614-629

Grechka, V. and Tsvankin, I., 1999, "3D moveout velocity analysis and parameter estimation for orthorhombic media", Geophysics, Vol. 64, No. 3, 820-837

Connolly, P., 1999 "Elastic Impedance", TLE, No. 4, 448-452

The invention claimed is:

1. Method of processing seismic data corresponding to acquisitions carried out in a medium exhibiting azimuthal anisotropy, the method comprising for two sets of data corresponding, for one and the same seismic variable and for one and the same ground zone, to at least two different source/receiver pair azimuths the steps of:

determining for each azimuth, an average between data corresponding, for the same variable and the same ground zone, to a perpendicular azimuth sector; and determining an estimation of a common part between the two sets of averaged data, said estimate of the common part corresponding to filtered data in which the uncorrelated noise has been removed and making determination of geological parameters possible.

2. Method according to claim 1, wherein the data set which corresponds to an estimate of the common part is subtracted from the two sets of data from which an average has been made between the two sets of data.

3. Method of processing seismic data corresponding to acquisitions carried out in a medium exhibiting azimuthal anisotropy, the method comprising the steps of:

acquiring, for a same seismic variable and for a same ground zone, two sets of data corresponding for one and the same seismic variable and one and the same ground zone to sectors of different source/receiver pair azimuths and to sectors of azimuths perpendicular to the source/receiver pair azimuths;

determining for each set, an average between data corresponding to perpendicular source/receiver pair azimuths;

determining an estimation of a common part between the two sets of averaged data, said common part being the invariant part between the two sets of data; and wherein for at least one azimuth:

the data set which corresponds to an estimate of the part common to the two sets of averaged data is subtracted from a data set corresponding to a sector along this azimuth and from a data set corresponding to a sector along a perpendicular azimuth, the polarity of one of the two sets of residual data that is thus obtained is inverted, an estimate of the part common to this one set of the two of residual data whose polarity has been inverted and to the other set of residual data is determined.

4. Method according to claim 3, wherein a set of filtered data which is the sum of the set of residual data which corresponds thereto and of the part common to the set of residual data whose polarity has been inverted is reconstituted for the sector corresponding to the perpendicular azimuth and to the other previously determined set of residual data.

5. Method using the filtering method of claim 4 previous to this step characterizing the azimuthal anisotropy of a medium, according to which a characterization processing is implemented on seismic data arising from acquisitions carried out on this medium, wherein a filtering processing according to claim 4, is implemented previously.

6. Method using the filtering method of claim 4 prior to this step characterizing fractures in a given medium, according to which a characterization processing is implemented on seismic data arising from acquisitions carried out on this medium.

7. Method of claim 1, wherein the data are seismic amplitudes.

8. Method according to claim 1, wherein the data are attributes derived from cubes of seismic amplitudes.

9. Method according to claim 7, wherein the data sets are cubes of seismic data.

10. Method of processing seismic data corresponding to acquisitions carried out in a medium exhibiting azimuthal anisotropy, the method comprising the steps of:

acquiring, for a same seismic variable and for a same ground zone, two sets of data corresponding for one and the same seismic variable and one and the same ground zone to sectors of different source/receiver pair azimuths and to sectors of azimuths perpendicular to the source/receiver pair azimuths;

determining for each set, an average between data corresponding to perpendicular source/receiver pair azimuths;

determining an estimation of a common part between the two sets of averaged data, said common part being the invariant part between the two sets of data;

wherein the data are seismic amplitudes;

wherein the data sets are cubes of seismic data; and wherein in order to determine a cube which is an estimate of a component common to at least two cubes of seismic data:

each of these two cubes of seismic data is converted into the frequency domain to obtain for each of them a real cube and an imaginary cube, a cube which is an estimate of the component common to the real cubes thus obtained and a cube which is an estimate of the component common to the two imaginary cubes thus obtained, and the two cubes, the one real, the other imaginary, thus obtained are converted into the time domain.

11. Method of processing seismic data corresponding to acquisitions carried out in a medium exhibiting azimuthal anisotropy, the method comprising the steps of:

acquiring, for a same seismic variable and for a same ground zone, two sets of data corresponding to sectors of different source/receiver pair azimuths and to sectors of azimuths perpendicular to the source/receiver pair azimuths;

determining for each set, an average between data corresponding to perpendicular source/receiver pair azimuths;

determining an estimation of a common part between the two sets of averaged data, said common part being the invariant part between the two sets of data;

wherein the data are seismic amplitudes;

wherein the data sets are cubes of seismic data; and wherein in order to determine a cube which is an estimate of a component common to at least two cubes:

each of these cubes is converted into the frequency domain so as to deduce therefrom for each of them an amplitude cube and a phase cube, an estimate of the part common to the amplitude cubes thus obtained is calculated.

12. Method according to claim 11, wherein:

the amplitude cube thus obtained is converted into the time domain while associating it respectively with the various phase cubes, each of the cubes thus obtained in the time domain is converted into the frequency domain so as to obtain for each of these cubes a real cube and an imaginary cube, a cube which is an estimate of the component common to the real cubes and a cube which is an estimate of the component common to the imaginary cubes are calculated, and the two cubes, the one real, the other imaginary, thus obtained are converted into the time domain.

13. Method of processing seismic data corresponding to acquisitions carried out in a medium exhibiting azimuthal anisotropy, the method comprising the steps of:

acquiring, for a same seismic variable and for a same ground zone, two sets of data corresponding to sectors of different source/receiver pair azimuths and to sectors of azimuths perpendicular to the source/receiver pair azimuths;

determining for each set, an average between data corresponding to perpendicular source/receiver pair azimuths;

determining an estimation of a common part between the two sets of averaged data, said common part being the invariant part between the two sets of data;

wherein the data are seismic amplitudes;

wherein the data sets are cubes of seismic data; and wherein in order to determine a cube which is an estimate of a component common to at least two cubes:

each of these cubes is converted into the frequency domain so as to deduce therefrom for each of them an amplitude cube, as well as a cube corresponding to its real part and a cube corresponding to its imaginary part,     cosine cubes and sine cubes are extracted from the cubes corresponding to the real part and from the cubes corresponding to the imaginary part,     an estimate of the part common to the cosine cubes and an estimate of the sine cubes are calculated,     a common-phase-data cube is deduced from the thus calculated cubes of common parts.

14. Method according to claim 13, wherein:

each of the cubes thus obtained in the time domain is converted into the frequency domain to obtain for each of these cubes a real cube and an imaginary cube, a cube which is an estimate of the component common to the real cubes and a cube which is an estimate of the component common to the imaginary cubes are calculated, and the two cubes, the one real, the other imaginary, thus obtained are converted into the time domain.

15. Method according to claim 10, wherein in order to calculate a cube which is an estimate of a component common to at least two cubes of seismic data, a factorial co-kriging processing is implemented.

16. Method according to claim 15, wherein in order to calculate a cube which is an estimate of a component common to at least two cubes of seismic data:

each of these cubes of seismic data is sampled so as to deduce therefrom for each of them a succession of 2D maps,     covariance and cross-variance matrices, corresponding to the variograms of both of these two maps, as well as to their cross variogram, are determined for each 2D map pair thus obtained,     a factorial co-kriging system which corresponds to these matrices is solved so as to deduce therefrom a spatial operator to be applied to the two 2D maps which correspond thereto, so as to deduce therefrom a 2D map which corresponds to their common component, the collection of 2D maps thus obtained making it possible to reconstitute the common cube of seismic data.

17. Method according to claim 16, wherein in order to determine the co-kriging system to be solved so as to deduce the spatial operator to be applied to two 2D maps, a mask intended to cancel the data of the said map over a certain zone is applied to the data of at least one of the two maps, prior to the determination of the covariances and of the cross-variances.

\* \* \* \* \*